United States Patent [19]

Cripps et al.

[11] 4,222,600
[45] Sep. 16, 1980

[54] VEHICLE STORAGE SPACE COVER ARRANGEMENT

[75] Inventors: David J. Cripps, Farmington Hills; Stanley Kwasiborski, Jr., Hazel Park, both of Mich.

[73] Assignee: General Motors Corporation, Detroit, Mich.

[21] Appl. No.: 8,527

[22] Filed: Feb. 1, 1979

[51] Int. Cl.² .............................................. B60R 5/04
[52] U.S. Cl. ................................. 296/37.1; 296/37.16
[58] Field of Search .................. 296/37.1, 37.8, 37.16, 296/24 R

[56] References Cited

U.S. PATENT DOCUMENTS

| | | | |
|---|---|---|---|
| 3,181,911 | 5/1965 | Peras | 296/37.1 |
| 3,291,520 | 12/1966 | Smith | 296/37.16 |
| 4,148,516 | 4/1976 | Gotomyo | 296/37.1 |

FOREIGN PATENT DOCUMENTS 2123462  1/1972  Fed. Rep. of Germany ........ 296/37.16

*Primary Examiner*—Robert R. Song
*Attorney, Agent, or Firm*—R. L. Phillips

[57] ABSTRACT

In a vehicle having a hinged closure member providing access by upward swinging movement to a storage space, there is provided a cover arrangement for the storage space having panels which are connected together by a one-way hinge with one of the panels also connected by a hinge to the closure member and another panel detachably secured by straps to the closure member. The one-way hinge and straps locate the panels in a generally co-planar relationship to permit same to rest on a support ledge and cover the storage space and then on upward swinging movement of the closure member the panels are moved to a position above the storage space while maintained in generally co-planar relationship to permit easy access to the storage space. Detachment of the upper ends of the straps permits the panels to be folded back-to-back and against the closure member whereafter the straps provide for detachable securement of the folded panels to maintain them against the closure member in a stored condition leaving the storage space open.

2 Claims, 4 Drawing Figures

VEHICLE STORAGE SPACE COVER ARRANGEMENT

This invention relates to a vehicle storage space cover arrangement and more particularly to a hinged panel assembly on the closure member providing cover for easy and clear access to the storage space.

In a vehicle of the hatchback or tailgate style wherein the closure member provides access to a storage space on the vehicle floor, it is desirable to provide a cover for the storage space to conceal goods stored therein. However, it is also desirable that there be easy access to the storage space and also that such cover be readily removable to provide maximum storage space when needed.

The present invention meets these objectives in a vehicle wherein the closure member is swung upward to provide access to the storage space with a very simple hinged panel assembly mounted on the closure member. The panel assembly by means of a unique arrangement of hinges and detachable straps can be simply conditioned to cover the storage space when the closure member is closed and provide easy access thereto when the closure member is opened or may be stored in a compact arrangement out of the way on the closure member to maximize the storage space.

These and other objects and advantages of the present invention will be more apparent from the following description and drawing in which.

Figure 1:
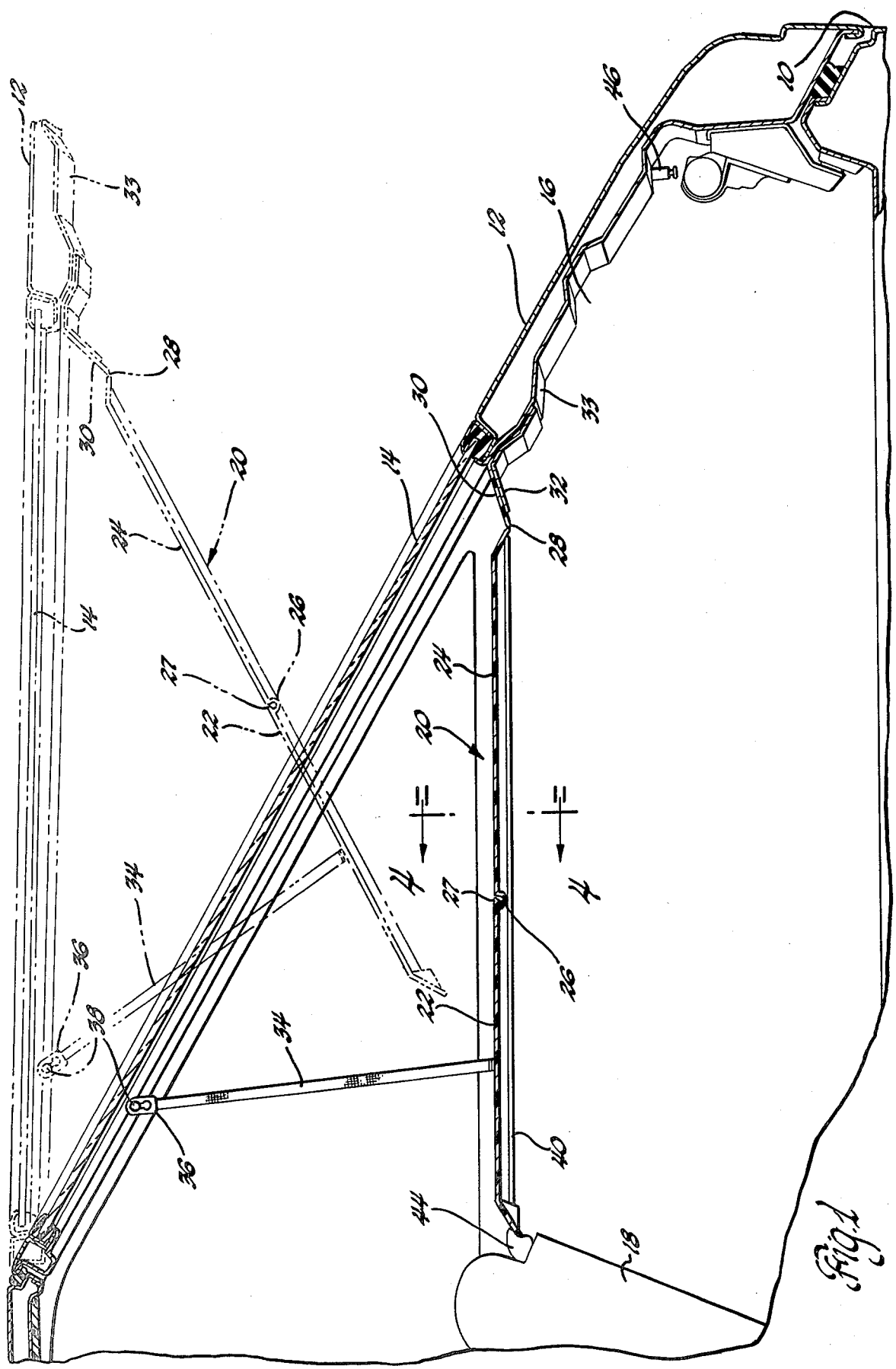
FIG. 1 is a vertical longitudinal sectional view of the rear portion of a vehicle of the hatchback style having a cover arrangement according to the present invention with the cover shown in solid line in a covering position covering the storage space with the hatch closed and shown in phantom-line in an uncovering position providing access to the storage space with the hatch open.

There is shown in FIG. 1 a vehicle body 10 of the hatchback style having a rear opening therein closed by a hatch or closure member 12 with a window 14 therein. The hatch 12 is hinged at its top edge to the vehicle roof and by upward swinging movement to the phantom-line position shown provides access to a storage space 16 in the rear of the vehicle behind seat 18.

Figure 2:
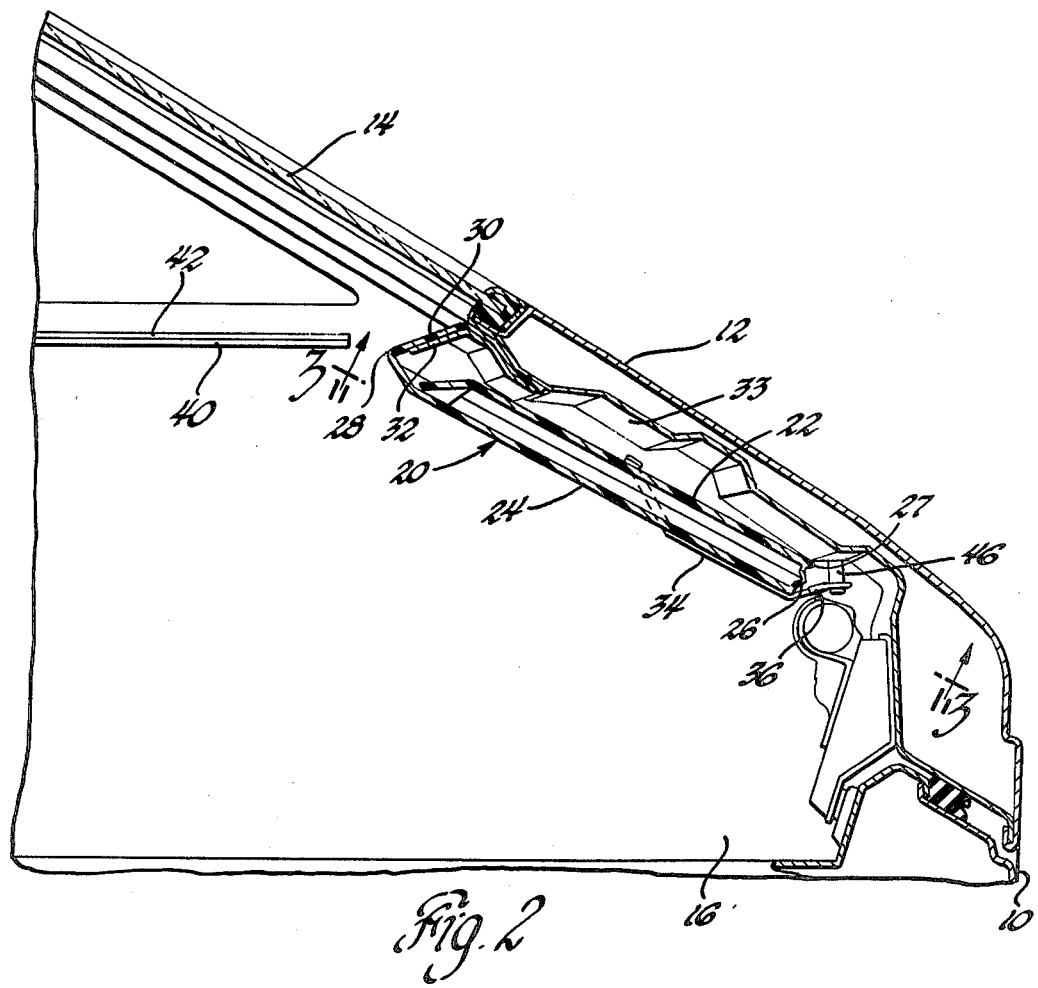
FIG. 2 is a view similar to FIG. 1 but showing the cover assembly folded and stored against the hatch.

According to the present invention, a cover assembly 20 for covering the storage space is mounted on the inner side of the hatch 12 below the lower edge of the window 14 and comprises front and rear panels 22 and 24 which are plastic moldings of rectangular shape and are arranged to extend along their long dimension crosswise of the storage space. The panels 22 and 24 are interconnected at adjacent edge portions along the length thereof by a one-way hinge 26 which may be molded integral with the panels as shown or may be of some other one-way type known in the hinge art such as an all-metal hinge or have hinge plates molded integral with the panels and pivotally connected by a metal hinge pin. The integrally molded one-way hinge 26 includes a projection 27 on the front panel hinge edge which blocks face-to-face folding movement of the panels as shown in FIG. 1 but permits back-to-back folding movement thereof as shown in FIG. 2. A second hinge 28 molded integral with and extending the length of rear edge of rear panel 24 has a hinge strap 30 which is fixed with an overlaying metal strip 32 to the inner panel 33 of the hatch 12 immediately below the lower edge of window 14. And again, the hinge 28 may be of some other type but need not be one-way acting like hinge 26.

A pair of laterally spaced flexible straps 34 of cloth fabric are permanently secured at their lower ends to the front panel 22 midway of the width thereof as viewed in FIG. 1 and adjacent its edges which extend parallel to the sides of the storage space and vehicle body as shown in FIG. 2. The upper ends of the straps 34 are, on the other hand, each detachably secured such as by a clasp 36 to a pin 38 fixed to the interior side of the hatch 12 adjacent a longitudinally extending edge of the window and the upper hinged edge of the hatch.

Figure 4:
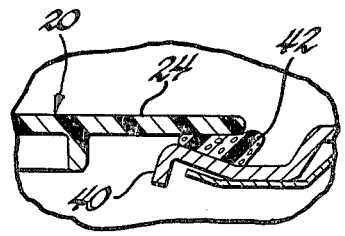
FIG. 4 is a view taken along the line 4—4 in FIG. 1.

Support of the panel assembly 20 with the hatch closed is provided in the vehicle body by horizontal flanges 40 which extend inwardly therefrom and above and along each side of the storage space between the hatch and the back of seat 18 as shown on the one side in FIGS. 2 and 4. The one-way hinge 26 and the lower ends of the straps 34 locate the panels in generally co-planar relationship and generally at the elevation of the supports 40 in the closed position of the hatch with the straps then hanging generally vertically to permit the panels to rest above and at the sides of the storage space on a trim pad 42 adhesively bonded to the supports 40. There is also provided a trim pad 44 secured to the back of the seat to cover the crack at the free front edge of the front panel 22.

Upward swinging movement of the hatch 12 to the open position shown in phantom-line in FIG. 1 moves the panels to a position above the storage space with the straps 34 and one-way hinge 26 maintaining the panels in generally co-planar relationship to permit easy and clear access to the storage space.

Figure 3:
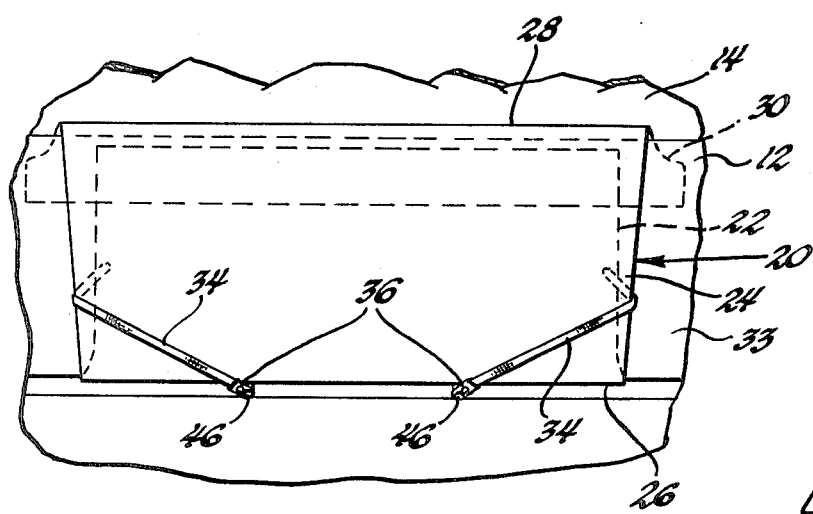
FIG. 3 is a view taken along the line 3—3 in FIG. 2.

Alternatively, when maximum storage space is needed, the upper ends of the straps 34 are detached permitting the front panel 22 to be folded back-to-back over the rear panel 24 about the one-way hinge 26 and the folded panels to then be swung about the hinge 28 and against the inner side of the hatch adjacent the free swinging lower edge thereof as shown in FIGS. 2 and 3. With the panels thus folded against the interior side of the hatch and out of sight below the window 14, the straps are then crossed over the lower corners of the folded panel assembly and attached by their clasps 36 to pins 46 fixed to the inner hatch panel 33 at laterally spaced points beyond the lower edge of the folded panels and adjacent the free swinging edge of the hatch to thus maintain the folded panels against the interior side of the hatch as shown in FIGS. 2 and 3.

The above described embodiment is illustrative of the invention which may be modified within the scope of the appended claims.

The embodiments of the invention in which an exclusive property or privilege is claimed are defined as follows:

1. The combination comprising, a vehicle having a closure member hinged at an upper edge to provide access by upward swinging movement to a storage space, support means located above and at opposite sides of said storage space, a cover assembly including front and rear panels, one-way hinge means interconnecting the panels to permit back-to-back folding movement of the panels and block face-to-face folding movement thereof, second hinge means hinging said rear panel to the closure member, a pair of laterally spaced straps secured at their lower ends to the front panel and secured at their upper ends to the closure member adjacent the hinged upper edge thereof, said one-way hinge means and said lower ends of said straps and said second hinge means co-operatively locating said panels in generally co-planar relationship and generally at the elevation of said support means in the closed position of said closure member to permit said panels to rest on said support means and cover such storage space and on upward swinging movement of said closure member cause said panels to move with said closure member to a position above said storage space while maintaining said panels in generally co-planar relationship to permit easy and clear access to said storage space.

2. The combination comprising, a vehicle having a closure member hinged at an upper edge to provide access by upward swinging movement to a storage space, support means located above and at opposite sides of said storage space, a cover assembly including front and rear panels, one-way hinge means interconnecting the panels to permit back-to-back folding movement of the panels and block face-to-face folding movement thereof, second hinge means hinging said rear panel to the closure member, a pair of laterally spaced straps secured at their lower ends to the front panel and detachably secured at their upper ends to the closure member adjacent the upper hinged edge thereof, said one-way hinge means and said lower ends of said straps and said second hinge means co-operatively locating said panels in generally co-planar relationship and generally at the elevation of said support means in the closed position of said closure member to permit said panels to rest on said support means and cover such storage space and on upward swinging movement of said closure member cause said panels to move with said closure member to a position above said storage space while maintaining said panels in generally co-planar relationship to permit easy and clear access to said storage space, detachment of said upper ends of said straps permitting said front panel to be folded back-to-back over said rear panel about said one-way hinge means and permitting said folded panels to then be swung about said second hinge means against said closure member adjacent the free swinging edge thereof, and means providing for detachable securement of said straps to said closure member adjacent the free swinging edge thereof and over the folded panels to maintain the folded panels against said closure member.

* * * * *